(12) United States Patent
Kang et al.

(10) Patent No.: US 6,862,551 B1
(45) Date of Patent: Mar. 1, 2005

(54) METHOD FOR MEASURING THE ABSOLUTE STEERING ANGLE OF STEERING SHAFT FOR VEHICLE USING TABLE

(75) Inventors: Chang-Won Kang, Seoul (KR); Wan-Sub Kim, Kyunggi-do (KR); Jong-Hwa Lee, Seoul (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 0 days.

(21) Appl. No.: 10/748,239

(22) Filed: Dec. 31, 2003

(30) Foreign Application Priority Data

Nov. 11, 2003 (KR) .................... 10-2003-0079319

(51) Int. Cl.$^7$ .................... G01C 9/00; G06F 15/00
(52) U.S. Cl. .................... 702/151
(58) Field of Search .................... 702/94, 95, 150–154; 33/1 PT, 1 N, 534; 701/41

(56) References Cited

U.S. PATENT DOCUMENTS 5,930,905 A   8/1999  Zabler et al. ............... 33/1 PT
6,466,889 B1  10/2002  Schodlbauer ............... 702/150
2004/0078166 A1 * 4/2004  Shin ............................ 702/145

* cited by examiner

Primary Examiner—Michael Nghiem
(74) Attorney, Agent, or Firm—Greenblum & Bernstein, P.L.C.

(57) ABSTRACT

A method is provided for measuring an absolute steering angle of a steering shaft for a vehicle using a first rotatable body and a second rotatable body that rotate together with the steering shaft of the vehicle at a predetermined rotation ratio, respectively. The method includes organizing a table by matching a plurality of relative rotational angle pairs ($\Psi'$, $\theta'$), where $\Psi'$ is a relative rotational angle of the first rotatable body, and $\theta'$ is a relative rotational angle of the second rotatable body, with respective absolute steering angles, $\Phi$s, that correspond to each of the relative rotational angle pairs. The method also includes obtaining a $\Psi_M'$ value by measuring the relative rotational angle $\Psi'$ of the first rotatable body and obtaining a $\theta_M'$ value by measuring the relative rotational angle $\theta'$ of the second rotatable body, using at least an angle sensor having a measurement range of $\Omega$. The method further includes obtaining an absolute steering angle $\Phi$ of the steering shaft corresponding to the measured relative rotational angle pair ($\Psi_M'$, $\theta_M'$) by looking up information in the table.

3 Claims, 3 Drawing Sheets

[FIG. 1]
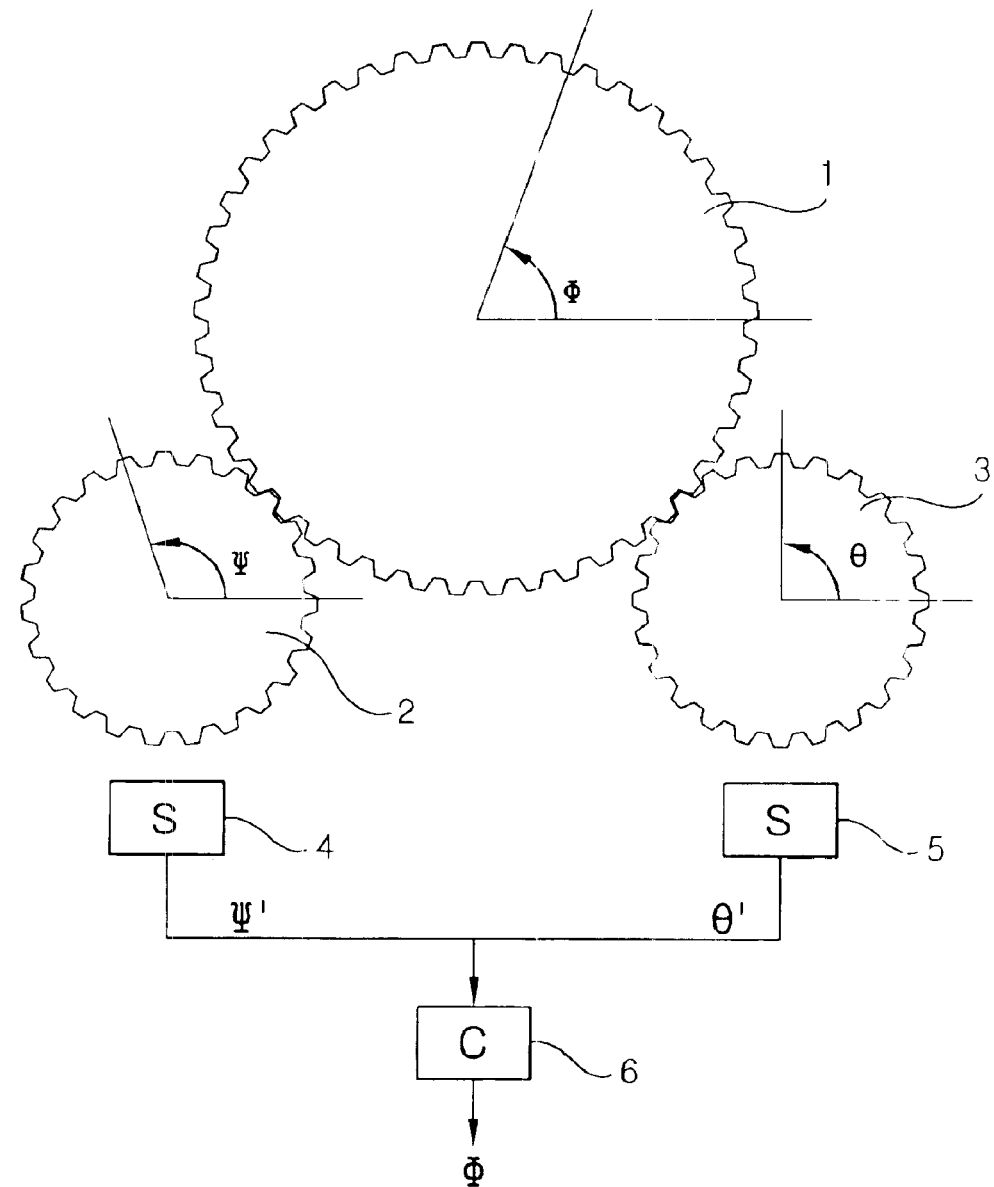

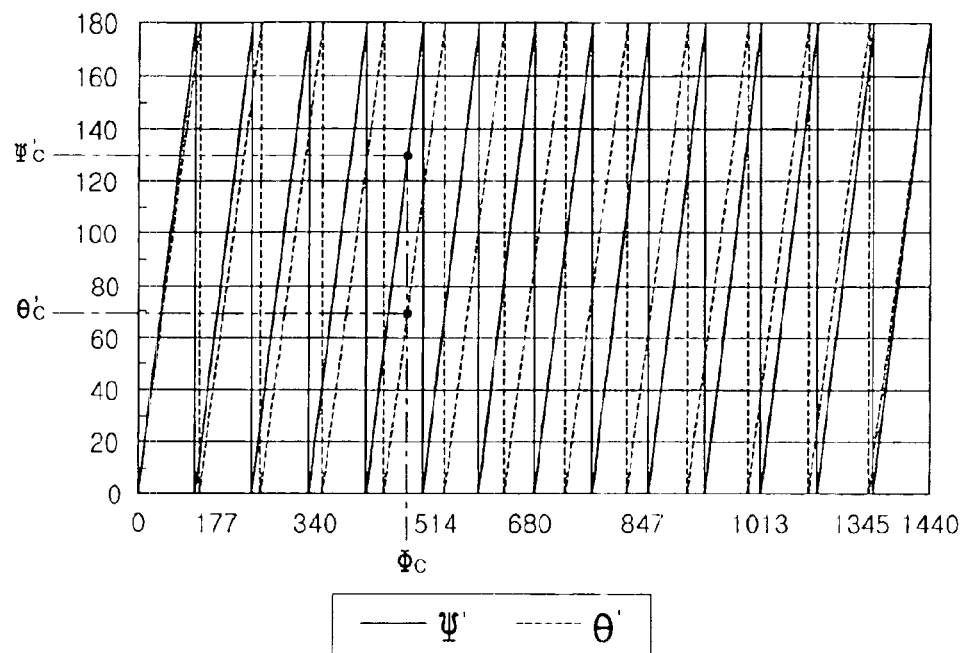
[FIG. 2]
[FIG. 3]
| Index | $\Phi$ | $\Psi'$ | $\theta'$ |
|---|---|---|---|
| 0 | 0 | 0 | 0 |
| 1 | $\Phi_1$ | $\Psi'_1$ | $\theta'_1$ |
| 2 | $\Phi_2$ | $\Psi'_2$ | $\theta'_2$ |
| ⋮ | ⋮ | ⋮ | ⋮ |
| $i$ | $\Phi_i$ | $\Psi'_i$ | $\theta'_i$ |
| $i+1$ | $\Phi_{i+1}$ | $\Psi'_{i+1}$ | $\theta'_{i+1}$ |
| ⋮ | ⋮ | ⋮ | ⋮ |
| $j$ | $\Phi_j$ | $\Psi'_j$ | $\theta'_j$ |
| ⋮ | ⋮ | ⋮ | ⋮ |
| $n$ | $\Phi_n$ | $\Psi'_n$ | $\theta'_n$ |

[FIG. 4]
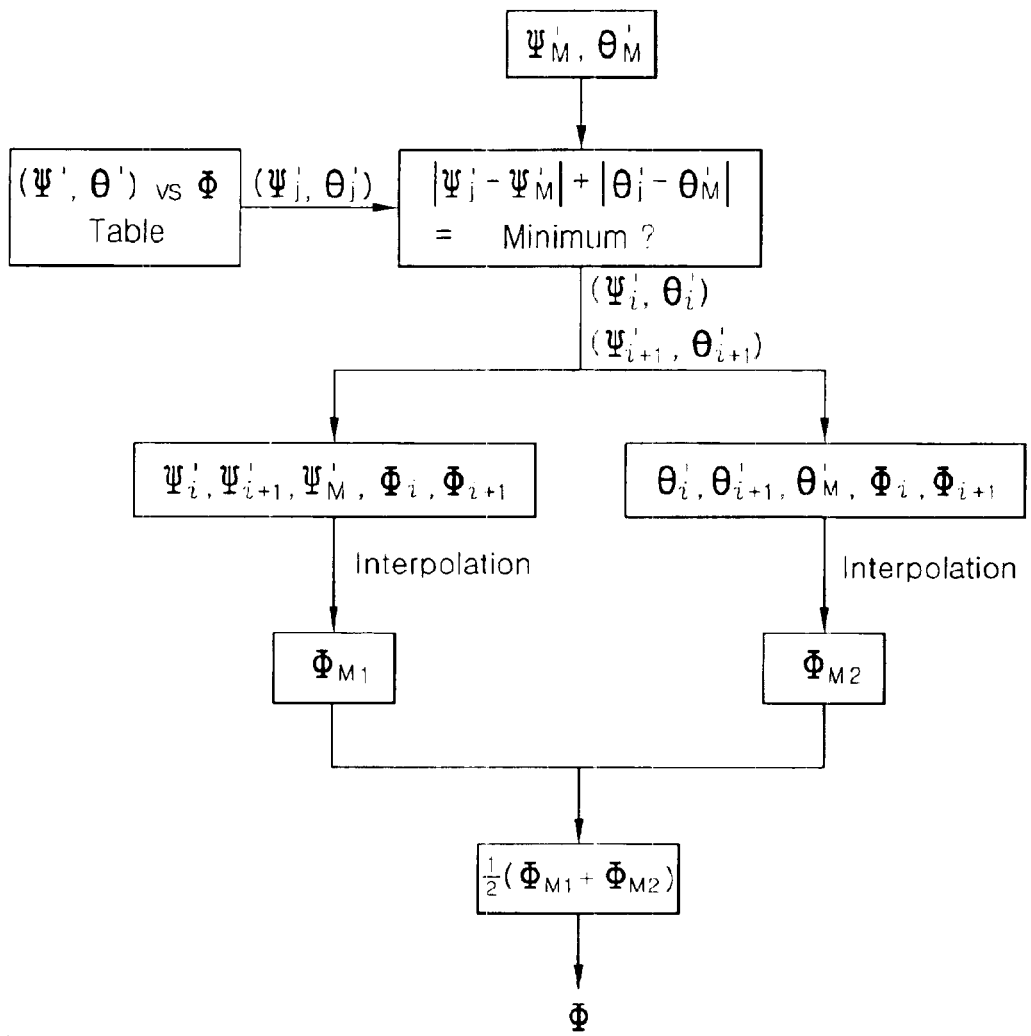

METHOD FOR MEASURING THE ABSOLUTE STEERING ANGLE OF STEERING SHAFT FOR VEHICLE USING TABLE

RELATED APPLICATIONS

The present disclosure relates to subject matter contained in priority Korean Application No. 10-2003-0079319, filed on Nov. 11, 2003, which is herein expressly incorporated by reference in its entirety.

BACKGROUND OF THE INVENTION

1. Field of the Invention

The present invention relates to a method for measuring an absolute steering angle of a steering shaft for a vehicle, and, more specifically, to a method for measuring an absolute steering angle of a steering shaft by using two rotatable bodies that rotate together with the steering shaft at a predetermined rotation ratio.

2. Description of the Related Art

In general, measurement of an absolute steering angle of a steering shaft using an angle sensor only is known to be difficult because the measurement range is greater than 360°.

Also the steering angle of the steering shaft should be immediately measured following start-up of a vehicle, regardless of an initial angular position. However, a prior steering angle would not be used to measure a relative change at present stage.

U.S. Pat. Nos. 5,930,905 and 6,466,889B1 disclose a method for measuring an absolute steering angle of a steering shaft based on rotational angular measurements of a first rotatable body and a second rotatable body that rotate together with a steering shaft at a predetermined rotation ratio.

In the disclosures, the absolute rotation angle of the first rotatable body and of the second rotatable body are expressed by $\Psi=\Psi'+i\Omega$ and $\theta=\theta'+j\Omega$, respectively (wherein, $\Omega$ indicates a measurement range of an angle sensor measuring the $\Psi'$ and the $\theta'$; i is a whole number representing the number of times when the first rotatable body's absolute rotation angle $\Psi$ is greater than the $\Omega$, i.e. a frequency of the first rotatable body; and j is a frequency of the second rotatable body), and the absolute steering angle, $\Phi$, can be obtained through a specific calculation procedure using measurements of $\Psi'$ and $\theta'$.

According to the U.S. Pat. No. 5,930,905, the measurements of $\Psi'$ and $\theta'$ are substituted to the following equation (1), which is derived from a geometrical relation among $\Psi$, $\theta$, and $\Phi$ to get k, and by rounding off k, a whole number k is obtained. Then the k, $\Psi'$ and $\theta'$ are substituted to the following equation (2) to obtain $\Phi$.

$k=\{(m+1)\Theta'-m\Psi'\}/\Omega$            <Equation 1>

$\Phi=\{m\Psi'+(m+1)\Theta'-(2m+1)k\Omega\}/2n$            <Equation 2>

(Here, m indicates the number of gear teeth of the first rotatable body; m+1 indicates the number of gear teeth of the second rotatable body; and n indicates the number of gear teeth formed on the steering shaft engaged with the first and second rotatable bodies.)

On the other hand, according to the U.S. Pat. No. 6,466,889B1, the steering angle, $\Phi$, can be obtained directly from a relation between the difference of absolute rotation angles of two rotatable bodies, $\Psi-\theta$, and 'i' of the first rotatable body (or 'j' the second rotatable body). Here, $\Psi-\theta$ is obtained by adding $\Omega$ to a measurement of $\Psi'-\theta'$ if the measurement is a negative value, or by applying a measurement of $\Psi'-\theta'$ if the measurement is not a negative value. The 'i' is calculated from the relation between $\Psi-\theta$ and i. $\Psi$ is calculated from the known values of $\Psi'$ and i. Based on these values, the absolute steering angle of a steering shaft, $\Phi$, is obtained.

When 'i' becomes k1 as the steering shaft is fully rotated, the rotation angle difference $\Psi-\theta$ should be equal or less than the measurement range of the angle sensor, namely $\Omega$ (cf. in the U.S. Pat. No. 6,466,889B1, $\Psi-\theta$ is set to be equal to $\Omega$). In other words, the rotation angle difference $\Psi-\theta$ successively varies from 0° to $\Omega$ until the steering shaft is fully rotated, and i-value varies step by step from 0 to k1.

In particular, the U.S. Pat. No. 6,466,889B1 made an assumption that $\Psi-\theta$ and i-value are in a linearly proportional relation with each other, meaning that the value for i successively varies from 0 to k1 as the rotation angle difference $\Psi-\theta$ successively varies from 0° to $\Omega$. Also, the value of 'i' is obtained by taking a maximum whole number that is smaller than a value obtained from the multiplication of $\Psi-\theta$ measured value and k1/$\Omega$. For example, if $\psi-\theta$ times k1/$\Omega$ is 5.9, i is 5.

However, the above method poses a problem that 'i–j' has to be either 0 or 1 and should not be greater than 2 because a maximum value of $\Psi-\theta$ cannot be greater than $\Omega$.

SUMMARY OF THE INVENTION

It is, therefore, an object of the present invention to provide a method for measuring an absolute steering angle of a steering shaft whose rotation range is greater than 360 degrees, not by obtaining a frequency of a first rotatable body or a second rotatable body but by utilizing a Table only.

Another object of the present invention is to provide a more simplified method for measuring an absolute steering angle of a steering shaft, without obtaining $\Psi-\theta$ and a round-off process.

Employed for the method for measuring the steering angle of the steering shaft for a vehicle are a first rotatable body and a second rotatable body that rotate together with the steering shaft at their predetermined rotation ratios.

An absolute rotational angle of the first rotatable body, $\Psi$, can be expressed as $\Psi'+a\Omega$, and an absolute rotational angle of the second rotatable body, $\theta$, can be expressed as $\theta'+b\Omega$. $\Psi'$ and $\theta'$ are measured by means of angle sensors. Here, $\Omega$ represents measurement ranges of the angle sensors, a-value is a whole number that represents a frequency of the first rotatable body, namely the number of times the first rotatable body ratates over $\Omega$(for example, if $\Psi$ is 380° in the case that $\Omega$ is 180°, then i is 2), and b-value indicates a frequency of the second rotatably body. In other words, the absolute rotational angle of the first rotatable body, $\Psi$, can be expressed by $\Psi'+a\Omega$, wherein $\Psi'$ is a relative rotational angle measured by the angle sensor whose measurement range is $\Omega$. The absolute rotational angle of the second rotatable body, $\theta$, can be expressed in the same manner.

The measurement ranges, $\Omega$s, of the angle sensors could be 180° or 360° or a different degree. Either contact angle sensors or non-contact angle sensors can be utilized as long as the angle sensors are suitable for the measurement of $\Psi'$ and $\theta'$.

To achieve the objects of the invention, provided is a method for measuring the absolute steering angle of the steering shaft for a vehicle using a first rotatable body and a second rotatable body that rotate together with the steering shaft of the vehicle at their respective predetermined rotation ratios, the method including the steps of: organizing a table by matching a plurality of relative rotational angle pairs ($\Psi'$, $\theta'$), wherein $\Psi'$ is a relative rotational angle of the first rotatable body, and $\theta'$ is a relative rotational angle of the second rotatable body, with respective absolute steering angles, $\Phi$s, corresponding to each of the relative rotational angle pairs; obtaining a $\Psi_M'$ value by measuring a relative rotational angle $\Psi'$ of the first rotatable body and obtaining a $\theta_M'$ value by measuring a relative rotational angle $\theta'$ of the second rotatable body by means of angle sensors whose measurement ranges are $\Omega$s; and obtaining an absolute steering angle $\Phi$ of a steering shaft corresponding to the measured relative rotational angle pair ($\Psi_M'$, $\theta_M'$) by looking up the table.

Preferably, the step of obtaining a corresponding absolute steering angle $\Phi$ includes the sub-steps of: obtaining from the table two consecutive pairs of relative rotational angle having the measured relative rotational angle pair ($\Psi_M'$, $\theta_M'$) therebetween, and two absolute steering angles corresponding to respective pairs; and obtaining a first absolute steering angle $\Phi$ (hereinafter, it is referred to as $\Phi_{M1}$ for convenience' sake) by applying two relative rotational angles of the first rotatable body included in the two pairs of the relative rotational angle, the two absolute steering angles corresponding to respective pairs, and the $\Psi_M'$, to an interpolation equation.

More preferably, the step of obtaining a corresponding absolute steering angle $\Phi$ includes the sub-steps of: obtaining from the table two consecutive pairs of relative rotational angle having the measured relative rotational angle pair ($\Psi_M'$, $\theta_M'$) therebetween, and two absolute steering angles corresponding to respective pairs; obtaining a first absolute steering angle $\Phi_{M1}$ by applying two relative rotational angles of the first rotatable body included in the two pairs of the relative rotational angle, the two absolute steering angles corresponding to respective pairs, and the $\Psi_M'$, to an interpolation equation; obtaining a second absolute steering angle $\Phi$ (hereinafter, it is referred to as $\Phi_{M2}$ for convenience' sake) by applying two relative rotational angles of the second rotatable body included in the two pairs of the relative rotational angle, the two absolute steering angles corresponding to respective pairs, and the $\theta_M'$, to an interpolation equation; and taking the mean value of the $\Phi_{M1}$ and the $\Phi_{M2}$.

Besides an interpolation equation, an extrapolation equation can also be applied to obtain the corresponding absolute steering angle $\Phi$ of the steering shaft to the measured relative rotational angle pair ($\Psi_M'$, $\theta_M'$).

BRIEF DESCRIPTION OF THE DRAWINGS

The above objects, features and advantages of the present invention will become more apparent from the following detailed description when taken in conjunction with the accompanying drawings, in which:

FIG. 1 illustrates a preferred embodiment of the present invention;

FIG. 2 graphically illustrates a relation between $\Psi'$ and $\theta'$ in accordance with a steering angle of a steering shaft;

FIG. 3 illustrates a table enlisting absolute steering angles ($\Phi$s) of a steering shaft with respect to a pair of relative rotational angles ($\Psi'$, $\theta'$); and FIG. 4 illustrates a procedure for measuring an absolute steering angle of a steering shaft in accordance with a preferred embodiment of the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIG. 1 shows a first rotatable body 2 and a second rotatable body 3 being engaged with a steering shaft 1, angle sensors 4 and 5 for measuring relative rotation angles $\Psi'$ and $\theta'$ of the first and second rotatable bodies, and an operational circuit 6 for conducting a designated operation using $\Psi'_M$ and $\theta'_M$ measurements provided by the sensors and for outputting a resulting $\Phi$.

FIG. 2 graphically shows a relation between a relative rotation angle ($\Psi'$) of the first rotatable body and a relative rotation angle ($\theta'$) of the second rotatable body during 4 rotations of the steering shaft. In FIG. 2, x-axis denotes the steering angle $\Phi$, and $\Omega$ is 180°. There is only one single absolute steering angle $\Phi$ of the steering shaft corresponding to a predetermined arbitrary pair of relative rotational angles ($\Psi'$, $\theta'$) of the first and second rotatable bodies. Accordingly, when the steering shaft rotates four times in total, the relative rotational angle pair ($\Psi'$, $\theta'$) and the absolute steering angle $\Phi$ are in a 1:1 relation. For example, as shown in FIG. 2, $\Phi c$ is the only absolute steering angle that corresponds to an arbitrary relative rotational angle pair ($\Psi c'$, $\theta c'$).

FIG. 3 is a table illustrating a 1:1 relation between the relative rotational angle pair ($\Psi'$, $\theta'$) and the absolute steering angle $\Phi$.

Preferably, the relative rotational angle of the first rotatable body, $\Psi'$, and the relative rotational angle of the second rotatable body, $\theta'$, listed on the table of FIG. 3 are experimentally measured as the steering angle of the steering shaft varies.

FIG. 4 illustrates a method for obtaining the absolute steering angle $\Phi$ of the steering shaft using a table shown in FIG. 3.

First of all, by employing an angle sensor whose measurement range is $\Omega$, relative rotational angles $\Psi'$ and $\theta'$ of the first and second rotatable bodies are measured to obtain their measurement values $\Psi_{M'} $ and $\theta_{M'}$.

Based on the $\Psi_M'$ and $\theta_M'$ measurements, two consecutive relative rotational angle pairs, e.g., ($\Psi_i'$, $\theta_i'$) and ($\Psi_{i+1}'$, $\theta_{i+1}'$) in FIG. 3, having the $\Psi_M'$ and $\theta_M'$ measurements therebetween, and their corresponding absolute steering angles, e.g., $\Phi_i$ and $\Phi_{i+1}$ in FIG. 3, are obtained from the table.

The ($\Psi_i'$, $\theta_i'$) and ($\Psi_{i+1}'$, $\theta_{i+1}'$), and their corresponding absolute steering angles $\Phi_i$ and $\Phi_{i+1}$ are preferably found form the table in FIG. 3 by finding the two pairs ($\Psi_i'$, $\theta_i'$)s corresponding to the two minimums of Equation 3 below.

$$|\Psi_j'-\Psi_M'|+|\Theta_j'-\Theta_M'| (\text{where } j=0, 1, 2, \ldots, n) \qquad <\text{Equation 3}>$$

In other words, if ($\Psi_i'$, $\theta_i'$) and ($\Psi_{i+1}'$, $\theta_{i+1}'$) are two pairs of relative rotational angles having the measurement value ($\Psi_M'$, $\theta_M'$) therebetween, two j-values that minimize the Equation 3 would be i and i+1.

More preferably, after the two pairs of relative rotational angles corresponding to the two minimums of the Equation 3 are obtained from the table shown in FIG. 3, it is confirmed whether or not the two relative rotational angle pairs are consecutive, such as i and i+1. If they are not consecutive, it means there is a measurement error or another kind of error.

Once $\Psi_i'$, $\Psi_{i+1}'$, $\Psi_M'$, $\Phi_i$, and $\Phi_{i+1}$ are obtained, it is possible to get the absolute steering angle $\Phi_{M1}$ corresponding to the measured relative rotational angle pair ($\Psi_M'$, $\theta_M'$)

by applying an interpolation equation expressed as Equation 4.

$$\Phi_{M1}=\Phi_i+\{(\Psi_M'-\Psi_i')/(\Psi_{i+1}'-\Psi_i')\}(\Phi_{i+1}-\Phi_i) \qquad \text{<Equation 4>}$$

More preferably, to get rid of measurement errors that may be included in $\Psi_M'$ and $\theta_M'$, an additional absolute steering angle of a steering shaft, $\Phi_{M2}$, corresponding to the $\theta_M'$, can be obtained by substituting $\theta_i'$, $\theta_{i+1}'$, $\theta_M'$, $\Phi_i$, and $\Phi_{i+1}$ into the interpolation equation expressed as Equation 4, and a mean value of $\Phi_{M1}$ and $\Phi_{M2}$ is taken.

Further, the difference between $\Phi_{M1}$ and $\Phi_{M2}$ is calculated to check whether the difference is greater than a predetermined value. The difference greater than the predetermined value indicates that the measurement error is not permissible.

According to the present invention, it is possible to reduce calculation errors found in round-off process to define the absolute steering angle (e.g., rounding off 'k'-value in U.S. Pat. No. 5,930,905 or rounding off 'i'-value in U.S. Pat. No. 6,466,889B1). That is, the present invention can resolve a serious error (+1) in the rounding off of the absolute steering angle.

Moreover, by taking a mean value of two absolute steering angles $\Phi_{M1}$ and $\Phi_{M2}$ of the steering shaft, it is possible to reduce measurement errors.

Also, according to the present invention, the measurement range of the absolute steering angle can easily be varied by modifying data in the table. In addition, by adding more data to the table as an angle sensor's measurement accuracy and an operational circuit's operation capacity are increased, the precision of measurement of the absolute steering angle can be improved.

By organizing the table with more detailed in-depth data, a user can even more easily get the absolute steering angle of the steering shaft corresponding to the measured relative rotational angle pair ($\Psi_M'$, $\theta_M'$), simply by looking up the table.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A method for measuring an absolute steering angle of a steering shaft for a vehicle using a first rotatable body and a second rotatable body that rotate together with the steering shaft of the vehicle at a predetermined rotation ratio, respectively, the method comprising:

organizing a table by matching a plurality of relative rotational angle pairs ($\Psi'$, $\theta'$), wherein $\Psi'$ is a relative rotational angle of the first rotatable body, and $\theta'$ is a relative rotational angle of the second rotatable body, with respective absolute steering angles, $\Phi$s, corresponding to each of the relative rotational angle pairs;

obtaining a $\Psi_M'$ value by measuring the relative rotational angle $\Psi'$ of the first rotatable body and obtaining a $\theta_M'$ value by measuring the relative rotational angle $\theta'$ of the second rotatable body using angle sensors having measurement ranges of $\Omega$; and obtaining an absolute steering angle $\Phi$ of the steering shaft corresponding to the measured relative rotational angle pair ($\Psi_M'$, $\theta_M'$) by looking up the table.

2. The method according to claim 1, wherein the obtaining a corresponding absolute steering angle $\Phi$ comprises:

obtaining from the table two consecutive pairs of relative rotational angle having the measured relative rotational angle pair ($\Psi_M'$, $\theta_M'$) therebetween, and two absolute steering angles corresponding to respective pairs; and obtaining a first absolute steering angle $\Phi_{M1}$ by applying two relative rotational angles of the first rotatable body included in the two pairs of the relative rotational angle, the two absolute steering angles corresponding to respective pairs, and the $\Psi_M'$, to an interpolation equation.

3. The method according to claim 1, wherein the obtaining a corresponding absolute steering angle $\Phi$ comprises:

obtaining from the table two consecutive pairs of relative rotational angle having the measured relative rotational angle pair ($\Psi_M'$, $\theta_M'$) therebetween, and two absolute steering angles corresponding to respective pairs;

obtaining a first steering angle $\Phi_{M1}$ by applying the two relative rotational angles of the first rotatable body included in the two pairs of the relative rotational angle, the two absolute steering angles corresponding to respective pairs, and the $\Psi_M'$, to an interpolation equation;

obtaining a second absolute steering angle $\Phi_{M2}$ by applying the two relative rotational angles of the second rotatable body included in the two pairs of the relative rotational angle, the two absolute steering angles corresponding to respective pairs, and the $\theta_M'$, to the interpolation equation; and taking the mean value of the $\Phi_{M1}$ and the $\Phi_{M2}$.

* * * * *